US009932251B2

(12) United States Patent
Crooks et al.

(10) Patent No.: US 9,932,251 B2
(45) Date of Patent: Apr. 3, 2018

(54) MEMBRANELESS SEAWATER DESALINATION

(71) Applicant: Board of Regents, The University of Texas System, Austin, TX (US)

(72) Inventors: Richard A. Crooks, Austin, TX (US); Kyle N. Knust, Austin, TX (US); Robbyn K. Perdue, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 262 days.

(21) Appl. No.: 14/136,541

(22) Filed: Dec. 20, 2013

(65) Prior Publication Data
US 2014/0183046 A1    Jul. 3, 2014

Related U.S. Application Data

(60) Provisional application No. 61/740,780, filed on Dec. 21, 2012.

(51) Int. Cl.
| | |
|---|---|
| *C02F 1/46* | (2006.01) |
| *C02F 1/461* | (2006.01) |
| *C02F 1/469* | (2006.01) |
| *C02F 103/08* | (2006.01) |

(52) U.S. Cl.
CPC .......... *C02F 1/4604* (2013.01); *C02F 1/4696* (2013.01); *C02F 2001/46128* (2013.01); *C02F 2103/08* (2013.01)

(58) Field of Classification Search
CPC .................. C02F 1/4604; C02F 1/4696; C02F 2001/46128; C02F 2103/08
See application file for complete search history.

(56) References Cited

U.S. PATENT DOCUMENTS 7,718,047 B2    5/2010  Koval et al.
7,857,978 B2   12/2010  Jensen et al.
(Continued)

FOREIGN PATENT DOCUMENTS

EP    1852176    11/2007
EP    2322486     5/2011
(Continued)

OTHER PUBLICATIONS

International Search Report and Written Opinion issued in International Application No. PCT/US2013/076916, dated Dec. 20, 2013, 12 pages.
(Continued)

*Primary Examiner* — Arun S Phasge
(74) *Attorney, Agent, or Firm* — Meunier Carlin & Curfman LLC

(57) ABSTRACT

Disclosed are microfluidic devices and systems for the desalination of water. The devices and systems can include an electrode configured to generate an electric field gradient in proximity to an intersection formed by the divergence of two microfluidic channels from an inlet channel. Under an applied bias and in the presence of a pressure driven flow of saltwater, the electric field gradient can preferentially direct ions in saltwater into one of the diverging microfluidic channels, while desalted water flows into second diverging channel. Also provided are methods of using the devices and systems described herein to decrease the salinity of water.

28 Claims, 7 Drawing Sheets

(56) References Cited

U.S. PATENT DOCUMENTS

| | | | |
|---|---|---|---|
| 7,981,268 | B2 | 7/2011 | Bourcier et al. |
| 8,038,887 | B2 | 10/2011 | Bakajin et al. |
| 8,075,951 | B2 | 12/2011 | Hammond-Cunningham et al. |
| 2004/0166504 | A1 | 8/2004 | Rossier et al. |
| 2008/0023333 | A1 | 1/2008 | Johnson |
| 2009/0242406 | A1 | 10/2009 | Han et al. |
| 2010/0282680 | A1 | 11/2010 | Su et al. |
| 2011/0147314 | A1 | 6/2011 | Kippeny et al. |
| 2011/0198225 | A1* | 8/2011 | Kim .................. B01D 57/02 204/452 |
| 2011/0220498 | A1 | 9/2011 | Ko et al. |
| 2011/0220574 | A1 | 9/2011 | Bakajin et al. |
| 2011/0253630 | A1 | 10/2011 | Bakajin et al. |
| 2011/0308953 | A1 | 12/2011 | Bazant et al. |
| 2012/0048804 | A1 | 3/2012 | Stetson et al. |
| 2012/0247979 | A1 | 10/2012 | Ko et al. |

FOREIGN PATENT DOCUMENTS

| | | |
|---|---|---|
| KR | 10-2008-0113911 | 12/2008 |
| WO | 2007013099 | 2/2007 |
| WO | 2007087274 | 8/2007 |
| WO | 2010126686 | 11/2010 |
| WO | 2012023064 | 2/2012 |

OTHER PUBLICATIONS

Kwak et al., Continuous-Flow Biomolecule and Cell Concentrator by Ion Concentration Polarization, Analytical Chemistry, 2011, vol. 83: pp. 7348-7355.

Sheridan et al., Bipolar electrode depletion: membraneless filtration of charged species using an electrogenerated electric field gradient, Analyst, 2011, vol. 136: pp. 4134-4137.

Anand et al., Bipolar Electrode Focusing: Faradaic Ion Concentration Polarization, Analytical Chemistry, 2011, vol. 83: pp. 2351-2358.

Kim et al., Nanofluidic concentration devices for biomolecules utilizing ion concentration polarization: theory, fabrication, and applications, Chemical Society Reviews, 2010, vol. 39: pp. 912-922.

Kim et al., Direct seawater desalination by ion concentration polarization, Nature Nanotechnology, 2010, vol. 5: pp. 297-301.

Knust et al., Dual-channel bipolar electrode focusing: simultaneous separation and enrichment of both anions and cations, Lab on a Chip, 2012, vol. 12: pp. 4107-4114.

Anand, Robbyn K. et al., "Bipolar Electrode Focusing: Faradaic Ion Concentration Polarization," Analytical Chemistry, vol. 83, No. 6, Feb. 25, 2011, pp. 2351-2358.

Dhopeshwarkar, Rahul et al., "Electrokinetics in Microfluidic Channels Containing a Floating Electrode," Journal of the American Chemical Society, vol. 130, No. 32, Jul. 22, 2008, pp. 10480-10481.

Perdue Robbyn K. et al., "Bipolar Electrode Focusing: The Effect of Current and Electric Filed on Concentration Enrichment," Analytical Chemistry, vol. 81, No. 24, Nov. 18, 2009, pp. 10149-10155.

Sheridan, Eoin et al., "Enrichment of Cations via Bipolar Electrode Focusing," Analytical Chemistry, vol. 84, No. 17, Aug. 14, 2012, pp. 7393-7399.

Laws, Derek R. et al., "Bipolar Electrode Focusing: Simultaneous Concentration Enrichment and Separation in a Microfluidic Channel Containing a Bipolar Electrode," Analytical Chemistry, vol. 81, No. 21, Sep. 30, 2009, pp. 3923-8929.

* cited by examiner

MEMBRANELESS SEAWATER DESALINATION

CROSS-REFERENCE TO RELATED APPLICATIONS

This application claims benefit of U.S. Provisional Application No. 61/740,780, filed Dec. 21, 2012, which is hereby incorporated herein by reference in its entirety.

STATEMENT REGARDING FEDERALLY SPONSORED RESEARCH OR DEVELOPMENT

This invention was made with Government Support under Agreement DE-FG02-06ER15758 awarded by the U.S. Department of Energy, and Contract EP-D-12-026 awarded by the U.S. Environmental Protection Agency. The Government has certain rights in the invention.

TECHNICAL FIELD

This application relates generally to devices, systems, and methods for the desalination of water.

BACKGROUND

The global demand for freshwater is growing rapidly. Many conventional sources of freshwater, including lakes, rivers, and aquifers, are rapidly becoming depleted. As a consequence, freshwater is becoming a limited resource in many regions. In fact, the United Nations estimates two-thirds of the world's population could be living in water stressed regions by 2025.

Currently, approximately 97% of the world's water supply is present as seawater. Desalination—the process by which salinated water (e.g., seawater) is converted to fresh water—offers the potential to provide dependable supplies of freshwater suitable for human consumption or irrigation. Unfortunately, existing desalination processes, including distillation and reverse osmosis, require both large amounts of energy and specialized, expensive infrastructure. As a consequence, desalination is currently expensive compared to most conventional sources of water, and often prohibitively expensive in developing regions of the world. Therefore, only a small fraction of total human water use is currently satisfied by desalination. More energy efficient methods for water desalination offer the potential to address the increasing demands for freshwater, particularly in water stressed regions.

SUMMARY

Disclosed are microfluidic devices and systems for the desalination of water.

Microfluidic devices for the desalination of water can comprise a desalination unit. The desalination unit can comprise an inlet channel fluidly connected to a dilute outlet channel and a concentrated outlet channel. The dilute outlet channel and the concentrated outlet channel can diverge from the inlet channel at an intersection. The desalination unit can further comprise an electrode in electrochemical contact with the desalination unit. The electrode can be configured to generate an electric field gradient in proximity to the intersection where dilute outlet channel and concentrated outlet channel diverge from the inlet channel. Under an applied bias and in the presence of a flow of saltwater, the electric field gradient can preferentially direct ions in the saltwater into concentrated outlet channel, while desalted water flows into the dilute outlet channel.

In some embodiments, the microfluidic device can further include an auxiliary channel fluidly isolated from the desalination unit. The auxiliary channel can be electrochemically connected to the desalination unit via a bipolar electrode. In these cases, the bipolar electrode can be configured to be in electrochemical contact with both the desalination unit and the auxiliary channel. Under an applied bias across the auxiliary channel and the desalination unit and in the presence of a flow of saltwater, the electric field gradient can preferentially direct ions in the saltwater into concentrated outlet channel of the desalination unit, while desalted water flows into the dilute outlet channel.

In some embodiments, the auxiliary channel comprises a desalination unit. In these embodiments, the microfluidic device can comprise two desalination units, which can be of identical or different structure. The first desalination unit can be electrochemically connected to the second desalination unit by a bipolar electrode. Under an applied bias across the first desalination unit and the second desalination unit and in the presence of a pressure driven flow of saltwater, the electric field gradient can preferentially direct ions in the saltwater into concentrated outlet channels of the first and second desalination units, while desalted water flows into the dilute outlet channels of the first and second desalination units.

A plurality of the microfluidic devices described herein can be combined to form a water purification system. The system can comprise a plurality of the devices described herein arranged in parallel or fluidly connected in series. The systems can also comprise a plurality of devices both arranged in parallel and fluidly connected in series. For example, the device can include a first pair of devices fluidly connected in series which are arranged in parallel with a second pair of devices fluidly connected in series. In such systems, the plurality of devices can be fabricated in a single plane (i.e., as a 2-dimensional system) or in three dimensions.

Also provided are methods of using the devices and systems described herein to decrease the salinity of water.

DESCRIPTION OF DRAWINGS

FIG. 7A is a fluorescence micrograph of the device taken before application of a potential bias. FIG. 7B is a fluorescence micrograph of the device taken upon application of a potential bias.

DETAILED DESCRIPTION

Disclosed are microfluidic devices and systems for the desalination of water.

Microfluidic devices for the desalination of water can comprise a desalination unit. The desalination unit can comprise an inlet channel fluidly connected to a dilute outlet channel and a concentrated outlet channel. The dilute outlet channel and the concentrated outlet channel can diverge from the inlet channel at an intersection. The desalination unit can also comprise an electrode in electrochemical contact with the desalination unit. The electrode can be configured to generate an electric field gradient in proximity to the intersection where dilute outlet channel and concentrated outlet channel diverge from the inlet channel.

Figure 1A:
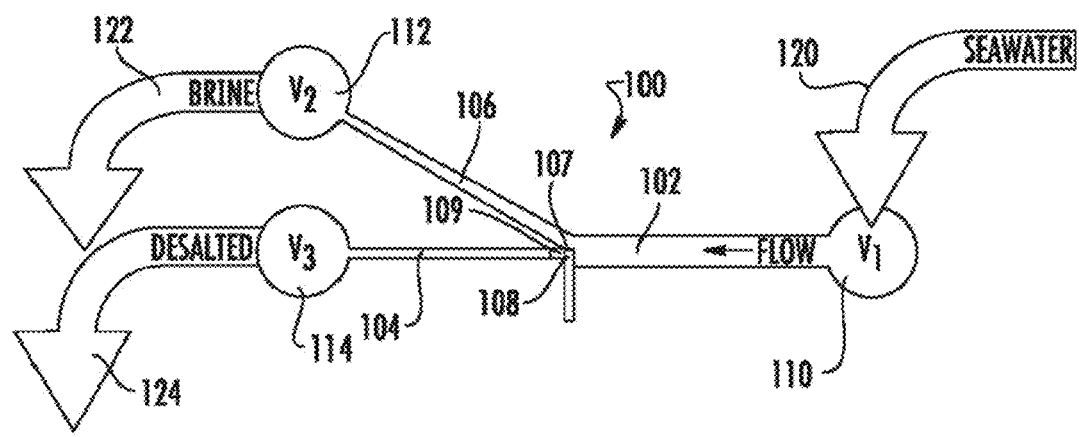
FIG. 1A is a schematic drawing illustrating a microfluidic device for the desalination of water.

An example device comprising a desalination unit (100) is schematically illustrated in FIG. 1A. The desalination unit includes an inlet channel (102) fluidly connected to a dilute outlet channel (104) and a concentrated outlet channel (106). The dilute outlet channel (104) and the concentrated outlet channel (106) diverge from the inlet channel (102) at an intersection (107). An electrode (108) is positioned in proximity to the intersection (107). The electrode (108) is configured to form an ion depletion zone (109) at and downstream of the electrode during device operation, resulting in the formation of an electric field gradient in proximity to the intersection. The example device further includes a fluid reservoir (110) fluidly connected to the upstream terminus of the inlet channel (102), a fluid reservoir (114) fluidly connected to the downstream terminus of the dilute outlet channel (104), and a fluid reservoir (112) fluidly connected to the downstream terminus of the concentrated outlet channel (106).

The dimensions of the microfluidic channels in the desalination unit (100) (e.g., the inlet channel (102), the dilute outlet channel (104), and the concentrated outlet channel (106)) can individually and/or in combination be selected in view of a number of factors, including the size and position of the electrode relative to the microfluidic channels in the desalination unit, the desired device flow rate, salinity of the saltwater being treated using the device, and the desired degree of salinity reduction.

In some instances, the dimensions of the inlet channel (102), the dilute outlet channel (104), and the concentrated outlet channel (106) are selected such that the sum of the area of a cross-section of dilute outlet channel and the area of a cross-section of the concentrated outlet channel is substantially equal to the area of a cross-section of the inlet channel. In this context, substantially equal can mean that the sum of the area of a cross-section of dilute outlet channel and the area of a cross-section of the concentrated outlet channel is with for example, 15%, of the area of a cross-section of the inlet channel (e.g., within 10% of the area of a cross-section of the inlet channel, or within 5% of the area of a cross-section of the inlet channel). In some embodiments, the dilute outlet channel, and the concentrated outlet channel have substantially equivalent cross-sectional dimensions, meaning that the height and width of the dilute outlet channel are substantially equivalent (e.g., within 15%, within 10%, or within 5%) to the height and width of the concentrated outlet channel.

The dimensions of the microfluidic channels in the desalination unit (100) (e.g., the inlet channel (102), the dilute outlet channel (104), and the concentrated outlet channel (106)) can be fabricated so as to have a variety of cross-sectional shapes. In some embodiments, the microfluidic channels in the desalination unit (e.g., the inlet channel, the dilute outlet channel, and the concentrated outlet channel) have a substantially square or rectangular cross-sectional shape.

In some embodiments, the inlet channel (102) has a width of about 1000 microns or less (e.g., about 900 microns or less, about 800 microns or less, about 750 microns or less, about 700 microns or less, about 600 microns or less, about 500 microns or less, about 400 microns or less, about 300 microns or less, about 250 microns or less, about 200 microns or less, about 150 microns or less, about 100 microns or less, about 75 microns or less, or about 50 microns or less). In some embodiments, the inlet channel (102) has a width of at least about 1 micron (e.g., at least about 5 microns, at least about 10 microns, at least about 15 microns, at least about 20 microns, at least about 25 microns, at least about 50 microns, at least about 75 microns, at least about 100 microns, at least about 150 microns, at least about 200 microns, at least about 250 microns, at least about 300 microns, at least about 400 microns, at least about 500 microns, at least about 600 microns, at least about 700 microns, at least about 750 microns, at least about 800 microns, at least about 900 microns, or at least about 1000 microns).

The inlet channel (102) can have a width that ranges from any of the minimum dimensions to any of the maximum dimensions described above. For example, the inlet channel (102) can have a width that ranges from about 1000 microns to about 1 micron (e.g., from about 750 microns to about 5 microns, from about 500 microns to about 10 microns, from about 250 microns to about 20 microns, or from about 150 microns to about 25 microns).

In some embodiments, the inlet channel (102) has a height of about 50 microns or less (e.g., about 45 microns or less, about 40 microns or less, about 35 microns or less, about 30 microns or less, about 25 microns or less, about 20 microns or less, about 15 microns or less, about 10 microns or less, about 9 microns or less, about 8 microns or less, about 7.5 microns or less, about 7 microns or less, about 6 microns or less, about 5 microns or less, about 4 microns or less, about 3 microns or less, about 2.5 microns or less, or about 2 microns or less). In some embodiments, the inlet channel (102) has a height of at least about 1 micron (e.g., at least about 2 microns, at least about 2.5 microns, at least about 3 microns, at least about 4 microns, at least about 5 microns, at least about 6 microns, at least about 7 microns, at least about 7.5 microns, at least about 8 microns, at least about 9 microns, at least about 10 microns, at least about 15 microns, at least about 20 microns, at least about 25 microns, at least about 30 microns, at least about 35 microns, at least about 40 microns, or at least about 45 microns).

The inlet channel (102) can have a height that ranges from any of the minimum dimensions to any of the maximum dimensions described above. For example, the inlet channel (102) can have a height that ranges from about 50 microns to about 1 micron (e.g., from about 45 microns to about 1 micron, from about 40 microns to about 1 micron, from about 35 microns to about 1 micron, from about 30 microns to about 1 micron, from about 25 microns to about 1 micron, or from about 20 microns to about 1 micron).

In some embodiments, the dilute outlet channel (104) has a width of about 500 microns or less (e.g., about 450 microns or less, about 400 microns or less, about 350 microns or less, about 300 microns or less, about 250 microns or less, about 200 microns or less, about 150 microns or less, about 125 microns or less, about 100 microns or less, about 75 microns or less, about 50 microns or less, about 25 microns or less, about 20 microns or less, about 15 microns or less, about 10 microns or less, about 5 microns or less, or about 1 micron or less). In some embodiments, the dilute outlet channel (104) has a width of at least about 0.5 microns (e.g., at least about 1 micron, at least about 2.5 microns, at least about 5 microns, at least about 10 microns, at least about 15 microns, at least about 20 microns, at least about 25 microns, at least about 50 microns, at least about 75 microns, at least about 100 microns, at least about 150 microns, at least about 200 microns, at least about 250 microns, at least about 300 microns, at least about 400 microns, or at least about 450 microns).

The dilute outlet channel (104) can have a width that ranges from any of the minimum dimensions to any of the maximum dimensions described above. For example, the dilute outlet channel (104) can have a width that ranges from about 500 microns to about 0.5 microns (e.g., from about 400 microns to about 1 micron, from about 250 microns to about 1 micron, from about 150 microns to about 5 microns, or from about 80 microns to about 10 microns).

In some embodiments, the dilute outlet channel (104) has a height of about 50 microns or less (e.g., about 45 microns or less, about 40 microns or less, about 35 microns or less, about 30 microns or less, about 25 microns or less, about 20 microns or less, about 15 microns or less, about 10 microns or less, about 9 microns or less, about 8 microns or less, about 7.5 microns or less, about 7 microns or less, about 6 microns or less, about 5 microns or less, about 4 microns or less, about 3 microns or less, about 2.5 microns or less, or about 2 microns or less). In some embodiments, the dilute outlet channel (104) has a height of at least about 1 micron (e.g., at least about 2 microns, at least about 2.5 microns, at least about 3 microns, at least about 4 microns, at least about 5 microns, at least about 6 microns, at least about 7 microns, at least about 7.5 microns, at least about 8 microns, at least about 9 microns, at least about 10 microns, at least about 15 microns, at least about 20 microns, at least about 25 microns, at least about 30 microns, at least about 35 microns, at least about 40 microns, or at least about 45 microns).

The dilute outlet channel (104) can have a height that ranges from any of the minimum dimensions to any of the maximum dimensions described above. For example, the dilute outlet channel (104) can have a height that ranges from about 50 microns to about 1 micron (e.g., from about 45 microns to about 1 micron, from about 40 microns to about 1 micron, from about 35 microns to about 1 micron, from about 30 microns to about 1 micron, from about 25 microns to about 1 micron, or from about 20 microns to about 1 micron).

In some embodiments, the concentrated outlet channel (106) has a width of about 500 microns or less (e.g., about 450 microns or less, about 400 microns or less, about 350 microns or less, about 300 microns or less, about 250 microns or less, about 200 microns or less, about 150 microns or less, about 125 microns or less, about 100 microns or less, about 75 microns or less, about 50 microns or less, about 25 microns or less, about 20 microns or less, about 15 microns or less, about 10 microns or less, about 5 microns or less, or about 1 micron or less). In some embodiments, the concentrated outlet channel (106) has a width of at least about 0.5 microns (e.g., at least about 1 micron, at least about 2.5 microns, at least about 5 microns, at least about 10 microns, at least about 15 microns, at least about 20 microns, at least about 25 microns, at least about 50 microns, at least about 75 microns, at least about 100 microns, at least about 150 microns, at least about 200 microns, at least about 250 microns, at least about 300 microns, at least about 400 microns, or at least about 450 microns).

The concentrated outlet channel (106) can have a width that ranges from any of the minimum dimensions to any of the maximum dimensions described above. For example, the concentrated outlet channel (106) can have a width that ranges from about 500 microns to about 0.5 microns (e.g., from about 400 microns to about 1 micron, from about 250 microns to about 1 micron, from about 150 microns to about 5 microns, or from about 80 microns to about 10 microns).

In some embodiments, the concentrated outlet channel (106) has a height of about 50 microns or less (e.g., about 45 microns or less, about 40 microns or less, about 35 microns or less, about 30 microns or less, about 25 microns or less, about 20 microns or less, about 15 microns or less, about 10 microns or less, about 9 microns or less, about 8 microns or less, about 7.5 microns or less, about 7 microns or less, about 6 microns or less, about 5 microns or less, about 4 microns or less, about 3 microns or less, about 2.5 microns or less, or about 2 microns or less). In some embodiments, the concentrated outlet channel (106) has a height of at least about 1 micron (e.g., at least about 2 microns, at least about 2.5 microns, at least about 3 microns, at least about 4 microns, at least about 5 microns, at least about 6 microns, at least about 7 microns, at least about 7.5 microns, at least about 8 microns, at least about 9 microns, at least about 10 microns, at least about 15 microns, at least about 20 microns, at least about 25 microns, at least about 30 microns, at least about 35 microns, at least about 40 microns, or at least about 45 microns).

The concentrated outlet channel (106) can have a height that ranges from any of the minimum dimensions to any of the maximum dimensions described above. For example, the concentrated outlet channel (106) can have a height that ranges from about 50 microns to about 1 micron (e.g., from about 45 microns to about 1 micron, from about 40 microns to about 1 micron, from about 35 microns to about 1 micron, from about 30 microns to about 1 micron, from about 25 microns to about 1 micron, or from about 20 microns to about 1 micron).

The length of the microfluidic channels in the desalination unit (100) (e.g., the inlet channel (102), the dilute outlet channel (104), and the concentrated outlet channel (106)) can vary. The length of the microfluidic channels in the desalination unit can individually be selected in view of a number of the overall device design and other operational considerations. In some embodiments, the inlet channel (102), the dilute outlet channel (104), and the concentrated outlet channel (106) each have a length of at least about 0.1 cm (e.g., at least about 0.2 cm, at least about 0.3 cm, at least about 0.4 cm, at least about 0.5 cm, at least about 0.6 cm, at least about 0.7 cm, at least about 0.8 cm, at least about 0.9 cm, at least about 1 cm, at least about 2 cm, at least about 2.5 cm, at least about 3 cm, at least about 4 cm, at least about 5 cm, or longer). The microfluidic channels in the desalination unit can be substantially linear in shape, or they can possess one or more non-linear regions (e.g., a curved region, a spiral region, an angular region, or combinations thereof) along the length of their fluid flow path.

With reference again to FIG. 1A, the dilute outlet channel (104) and the concentrated outlet channel (106) diverge from the inlet channel (102) at an intersection (107). The orientation of the dilute outlet channel (104) and the concentrated outlet channel (106) with respect to one another at the intersection can be varied. The angle formed between the dilute outlet channel (104) and the concentrated outlet channel (106) in a device can be selected in view of a number of parameters, including the size and position of the electrode relative to the microfluidic channels in the desalination unit, the desired device flow rate, salinity of the saltwater being treated using the device, and the desired degree of salinity reduction.

In some cases, the angle formed between the dilute outlet channel (104) and the concentrated outlet channel (106) at the intersection (107) is about 60 degrees or less (e.g., about 55 degrees or less, about 50 degrees or less, about 45 degrees or less, about 40 degrees or less, about 35 degrees or less, about 30 degrees or less, about 25 degrees or less, about 20 degrees or less, about 15 degrees or less, or less).

The electrode (108) can be fabricated from any suitable conductive material, such as a metal (e.g., gold), metal alloy, metal oxide, or conductive carbon. The electrode (108) is configured so as to be in electrochemical contact with the desalination unit (100), meaning that the electrode (108) can participate in a faradaic reaction with one or more components of a solution present in a microfluidic channel of the desalination unit. For example, the electrode (108) can be configured such that a surface of the electrode is in direct contact with fluid present in a microfluidic channel of the desalination unit. The device can be configured such that the electrode (108) can function as either an anode, cathode, or anode and cathode during device operation.

The position and dimensions of the electrode (108) relative to the desalination unit can be selected in view of a number of factors, including the size and configuration of the microfluidic channels in the desalination unit, the desired device flow rate, salinity of the saltwater being treated using the device, and the desired degree of salinity reduction. The electrode (108) can have a variety of 2-dimensional or 3-dimensional shapes, provided that the electrode (108) can be integrated into the device, and is compatible with the formation of an electric field gradient suitable to direct ions flowing through the inlet channel (102) preferentially into the concentrated outlet channel (106). In certain embodiments, the electrode (108) is a conductive surface (e.g., a line, a rectangular pad, or a square pad) substantially co-planar with the floor of the inlet channel (102), and integrated into the floor of the inlet channel in proximity to the intersection (107). In other embodiments, the electrode (108) is a conductive surface (e.g., a line, a rectangular pad, or a square pad) that is fabricated onto/into the floor of the inlet channel in proximity to the intersection (107), and which extends from the floor of the inlet channel into the inlet channel. In these embodiments, the electrode can be said to have a height, measured as the distance from the floor of the inlet channel to the surface or edge of the electrode within the inlet channel positioned at greatest distance from the floor of the inlet channel.

With reference again to FIG. 1A, the electrode (108) can be positioned in proximity to the intersection (107) so as to form an ion depletion zone (109) at and downstream of the electrode (108), and extending into the dilute outlet channel (104) during device operation. The ion depletion zone (109) can optionally extend into a portion of the concentrated inlet channel (106). In some embodiments, the electrode (108) is positioned within the floor of the inlet channel (102) upstream of the opening of the dilute outlet channel (104).

Figure 1B:
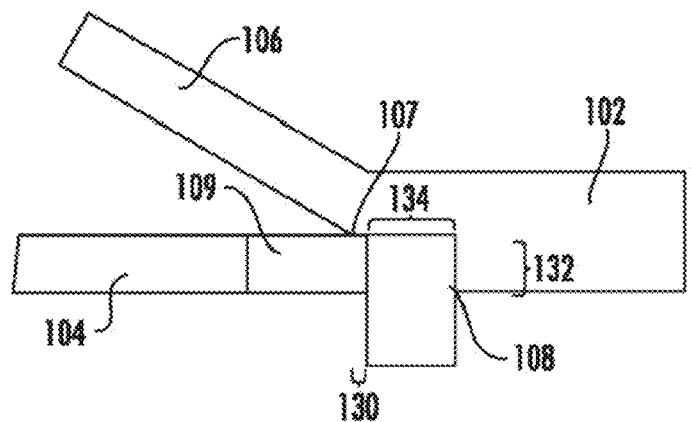
FIG. 1B is a schematic drawing illustrating an enlarged portion of the microfluidic device shown in FIG. 1A.

By way of exemplification, FIG. 1B illustrates an enlarged view of the intersection (107) of the device shown in FIG. 1A. The electrode (108) is positioned within the floor of the inlet channel (102). The surface of the electrode (108) in electrochemical contact with the desalination unit is positioned approximately ±50 microns (measured as the distance from the opening of the dilute outlet channel to the downstream edge of the electrode, 130) upstream or downstream of the opening of the dilute outlet channel (104).

In certain embodiments, the surface of the electrode (108) in electrochemical contact with the desalination unit is positioned upstream of the opening of the dilute outlet channel (104), and within about 500 microns of the opening of the dilute outlet channel (e.g., within about 400 microns, within about 300 microns, within about 250 microns, within about 200 microns, within about 150 microns, within about 100 microns, within about 90 microns, within about 80 microns, within about 75 microns, within about 70 microns, within about 60 microns, within about 50 microns, within about 40 microns, within about 30 microns, within about 25 microns, within about 20 microns, or within about 10 microns).

In some embodiments, the surface of the electrode (108) in electrochemical contact with the desalination unit is positioned downstream of the opening of the dilute outlet channel (104), and within about 100 microns of the opening of the dilute outlet channel (e.g., within about 90 microns, within about 80 microns, within about 75 microns, within about 70 microns, within about 60 microns, within about 50 microns, within about 40 microns, within about 30 microns, within about 25 microns, within about 20 microns, within about 10 microns, or within about 5 microns). When the surface of the electrode (108) in electrochemical contact with the desalination unit is positioned downstream of the opening of the dilute outlet channel (104), the length of the electrode (as discussed below) must be sufficient such that at least a portion of the electrode (108) in electrochemical contact with the desalination unit extends beyond the opening of the dilute outlet channel (104), and into the inlet channel (i.e., a portion of the electrode must be located upstream of the dilute outlet channel)

Again referring to FIG. 1B, the surface of the electrode (108) in electrochemical contact with the desalination unit can have a width (132, measured as the distance from one side of the surface of the electrode to the other side of the surface of the electrode along an axis perpendicular to the direction of fluid flow through the inlet channel) and a length (134, measured as the distance from one side of the surface of the electrode to the other side of the surface of the electrode along an axis parallel to the direction of fluid flow through the inlet channel). By way of exemplification, in the example device to FIG. 1B, the surface of the electrode (108) in electrochemical contact with the desalination unit has a width (132) that is about equal to the width of the dilute outlet channel (104) (50 microns), and a length (134) of about 100 microns.

In some embodiments, the surface of the electrode (108) in electrochemical contact with the desalination unit has a width (132) of at least about 50% of the width of the dilute outlet channel (104) (e.g., at least about 60% of the width of the dilute outlet channel, at least about 70% of the width of the dilute outlet channel, at least about 75% of the width of the dilute outlet channel, at least about 80% of the width of the dilute outlet channel, at least about 90% of the width of the dilute outlet channel, at least about 90% of the width of the dilute outlet channel, at least the width of the dilute outlet channel, at least about 105% of the width of the dilute outlet channel, or at least about 110% of the width of the dilute outlet channel). In some embodiments, the surface of the electrode (108) in electrochemical contact with the desalination unit has a width (132) that is less than about 150% of the width of the dilute outlet channel (104) (e.g., less than about 140% of the width of the dilute outlet channel, less than about 130% of the width of the dilute outlet channel, less than about 125% of the width of the dilute outlet channel, less than about 120% of the width of the dilute outlet channel, less than about 110% of the width of the dilute outlet channel, less than about 105% of the width of the dilute outlet channel, or less than the width of the dilute outlet channel).

The surface of the electrode (108) in electrochemical contact with the desalination unit can have a width (132) that ranges from any of the minimum dimensions to any of the maximum dimensions described above. For example, the surface of the electrode (108) in electrochemical contact with the desalination unit can have a width (132) that ranges from about 50% of the width of the dilute outlet channel (104) to about 150% of the width of the dilute outlet channel (e.g., from about 75% of the width of the dilute outlet channel to about 125% of the width of the dilute outlet channel, from about 90% of the width of the dilute outlet channel to about 110% of the width of the dilute outlet channel, or from about 95% of the width of the dilute outlet channel to about 105% of the width of the dilute outlet channel). In certain embodiments, the surface of the electrode (108) in electrochemical contact with the desalination unit has a width (132) that is about equal to the width of the dilute outlet channel (104).

In some embodiments, the surface of the electrode (108) in electrochemical contact with the desalination unit has a width (132) that is at least about 25% of the width of the inlet channel (102) (e.g., at least about 30% of the width of the inlet channel, at least about 40% of the width of the inlet channel, at least about 45% of the width of the inlet channel, at least about 50% of the width of the inlet channel, at least about 55% of the width of the inlet channel, or at least about 60% of the width of the inlet channel). In some embodiments, the surface of the electrode (108) in electrochemical contact with the desalination unit has a width (132) that is less than about 75% of the width of the inlet channel (102) (e.g., less than about 60% of the width of the inlet channel, less than about 55% of the width of the inlet channel, less than about 50% of the width of the inlet channel, less than about 45% of the width of the inlet channel, or less than about 40% of the width of the inlet channel).

The surface of the electrode (108) in electrochemical contact with the desalination unit can have a width (132) that ranges from any of the minimum dimensions to any of the maximum dimensions described above. For example, the surface of the electrode (108) in electrochemical contact with the desalination unit can have a width (132) that ranges from about 25% of the width of the inlet channel (102) to about 75% of the width of the inlet channel (e.g., from about 30% of the width of the dilute outlet channel to about 70% of the width of the dilute outlet channel, from about 40% of the width of the dilute outlet channel to about 60% of the width of the dilute outlet channel, or from about 45% of the width of the dilute outlet channel to about 55% of the width of the dilute outlet channel). In certain embodiments, the surface of the electrode (108) in electrochemical contact with the desalination unit has a width (132) that is about 50% of the width of the inlet channel (102).

In some embodiments, the surface of the electrode (108) in electrochemical contact with the desalination unit has a width (132) of about 600 microns or less (e.g., about 500 microns or less, about 450 microns or less, about 400 microns or less, about 350 microns or less, about 300 microns or less, about 250 microns or less, about 200 microns or less, about 150 microns or less, about 125 microns or less, about 100 microns or less, about 75 microns or less, about 50 microns or less, about 25 microns or less, about 20 microns or less, about 15 microns or less, about 10 microns or less, about 5 microns or less, or about 1 micron or less). In some embodiments, the surface of the electrode (108) in electrochemical contact with the desalination unit has a width (132) of at least about 0.5 microns (e.g., at least about 1 micron, at least about 2.5 microns, at least about 5 microns, at least about 10 microns, at least about 15 microns, at least about 20 microns, at least about 25 microns, at least about 50 microns, at least about 75 microns, at least about 100 microns, at least about 150 microns, at least about 200 microns, at least about 250 microns, at least about 300 microns, at least about 400 microns, at least about 450 microns, or at least about 500 microns).

The surface of the electrode (108) in electrochemical contact with the desalination unit can have a width (132) that ranges from any of the minimum dimensions to any of the maximum dimensions described above. For example, the surface of the electrode (108) in electrochemical contact with the desalination unit can have a width (132) that ranges from about 600 microns to about 0.5 microns (e.g., from about 400 microns to about 1 micron, from about 250 microns to about 1 micron, from about 150 microns to about 5 microns, or from about 80 microns to about 10 microns).

The length (134) of the surface of the electrode (108) in electrochemical contact with the desalination unit can be varied. In some embodiments the surface of the electrode (108) has a length (134) of at least about 10 microns (e.g., at least about 15 microns, at least about 20 microns, at least about 25 microns, at least about 50 microns, at least about 75 microns, at least about 100 microns, at least about 150 microns, at least about 200 microns, at least about 250 microns, at least about 300 microns, at least about 400 microns, at least about 450 microns, or at least about 450 microns). In some embodiments, the surface of the electrode (108) has a length (134) of less than about 500 microns (e.g., less than about 400 microns, less than about 300 microns, less than about 250 microns, less than about 200 microns, or less than about 100 microns).

The surface of the electrode (108) in electrochemical contact with the desalination unit can have a length (134) that ranges from any of the minimum dimensions to any of the maximum dimensions described above. For example, the surface of the electrode (108) can have a length (134) that ranges from about 10 microns to about 500 microns (e.g., from about 25 microns to about 250 microns, or from about 50 microns to about 150 microns).

The height of the electrode (108) in electrochemical contact with the desalination unit can also be varied. The height of the electrode (108) can be selected in view of a number of factors, including the height of the microfluidic channels in the desalination unit. In some cases, the height of the electrode (108) is approximately zero (i.e., the electrode is substantially co-planar with the floor of the inlet channel). In some embodiments, the height of the electrode (108) is less than about 1 micron (e.g., less than about 900 nm, less than about 800 nm, less than about 750 nm, less than about 700 nm, less than about 600 nm, less than about 500 nm, less than about 400 nm, less than about 300 nm, less than about 250 nm, less than about 200 nm, or less than about 100 nm).

Figure 1C:
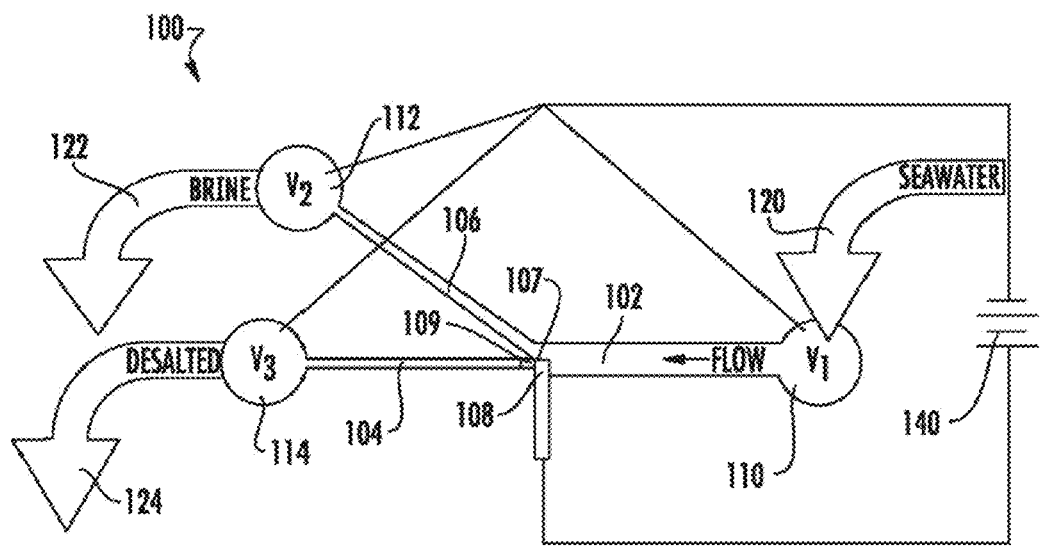
FIG. 1C is a schematic drawing illustrating a microfluidic device for the desalination of water in combination with a power supply configured to apply a potential bias across the desalination unit.

As shown in FIG. 1C, a power supply (140) can be configured to apply a potential bias across the desalination unit. A flow of saltwater (120) can be initiated from the inlet channel (102) to the dilute outlet channel (104) and the concentrated outlet channel (106). Upon application of a potential bias, an ion depletion zone (109) and subsequent electric field gradient are formed near the electrode (108) in proximity to the intersection (107). As a consequence, ions in the saltwater are preferentially directed into the concentrated outlet channel (106), resulting in a brine (122) flowing through the concentrated outlet channel. Desalted water (i.e., water containing less salt that the saltwater introduced into the inlet channel; 124) flows into the dilute outlet channel (104).

Figure 2:
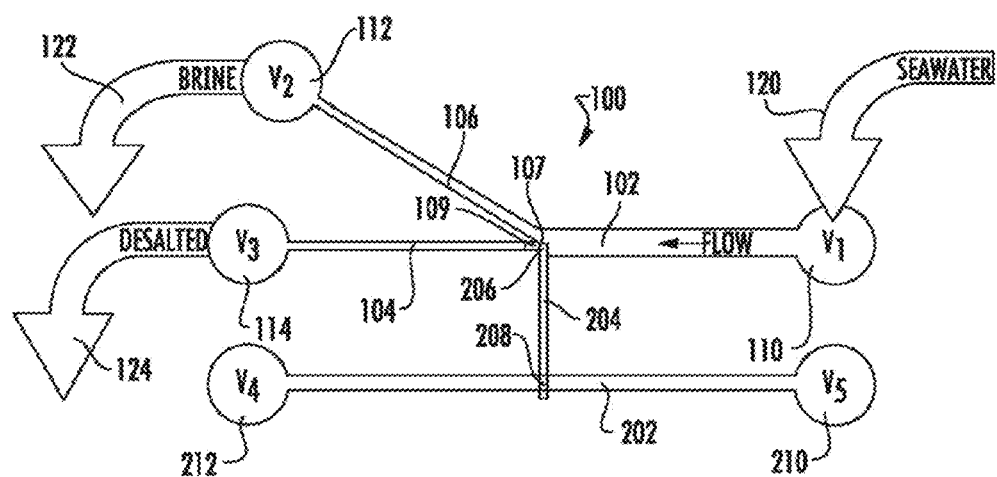
FIG. 2 is a schematic drawing illustrating a microfluidic device for the desalination of water. The device includes a desalination unit and an auxiliary channel electrochemically connected by a bipolar electrode.

In some embodiments, the microfluidic device can further include an auxiliary channel fluidly isolated from the desalination unit. An example device comprising a desalination unit (100) and an auxiliary channel (202) is schematically illustrated in FIG. 2. The desalination unit includes an inlet channel (102) fluidly connected to a dilute outlet channel (104) and a concentrated outlet channel (106). The dilute outlet channel (104) and the concentrated outlet channel (106) diverge from the inlet channel (102) at an intersection (107). The device also includes and an auxiliary channel (202) which is fluidly isolated from the desalination unit (100).

The auxiliary channel (202) can comprise, for example, a single microfluidic channel. In these embodiments, dimensions of the auxiliary channel (e.g., height, width, and length) can vary. The dimensions of the auxiliary channel (202) can individually be selected in view of a number of the overall device design and other operational considerations. The auxiliary channel (202) can be substantially linear in shape, or it can possess one or more non-linear regions (e.g., a curved region, a spiral region, an angular region, or combinations thereof) along the length of their fluid flow path. The auxiliary channel (202) can optionally possess one or more branch points. The auxiliary channel (202) can further include additional elements, such as electrodes, fluid inlets, fluid outlets, fluid reservoirs, valves, pumps, and combinations thereof, connected to the auxiliary channel to facilitate device operation.

The auxiliary channel (202) can be electrochemically connected to the desalination unit (100) via a bipolar electrode. In these embodiments, the bipolar electrode is configured so as to be in electrochemical contact with both the desalination unit (100) and the auxiliary channel (202), meaning that a first surface of the bipolar electrode can participate in a faradaic reaction with one or more components of a solution present in a microfluidic channel of the desalination unit, and a second surface of the bipolar electrode can participate in a faradaic reaction with one or more components of a solution present in the auxiliary channel.

The device can be configured such that the bipolar electrode comprises an anode in electrochemical contact with the desalination unit and a cathode in electrochemical contact with the auxiliary channel during device operation. Alternatively, the device can be configured such that the bipolar electrode comprises a cathode in electrochemical contact with the desalination unit and an anode in electrochemical contact with the auxiliary channel during device operation.

By way of exemplification, referring again to the example device illustrated in FIG. 2, a bipolar electrode (204) electrochemically connects the auxiliary channel (202) and the desalination unit (100). A first surface of the bipolar electrode (206) is in electrochemical contact with the desalination unit (100), and is positioned in proximity to the intersection (107). The first surface of the bipolar electrode (206) is configured to form an ion depletion zone (109) at and downstream of the surface of the bipolar electrode during device operation, resulting in the formation of an electric field gradient in proximity to the intersection. A second surface of the bipolar electrode (208) is in electrochemical contact with the auxiliary channel (202).

The first surface of the bipolar electrode (206) can occupy the same position within the desalination unit, and have the same dimensions as the surface of electrode (108) described above with respect to the first desalination unit.

Referring again to FIG. 2, the example device further includes a fluid reservoir (110) fluidly connected to the upstream terminus of the inlet channel (102), a fluid reservoir (114) fluidly connected to the downstream terminus of the dilute outlet channel (104), a fluid reservoir (112) fluidly connected to the downstream terminus of the concentrated outlet channel (106), and fluid reservoirs (210 and 212) fluidly connected to the termini of the auxiliary channel (202).

A power supply can be configured to apply a potential bias across the auxiliary channel (202) and the desalination unit (100). A flow of saltwater (120) can be initiated from the inlet channel (102) to the dilute outlet channel (104) and the concentrated outlet channel (106). Upon application of a potential bias, an ion depletion zone (109) and subsequent electric field gradient are formed near the first surface of the bipolar electrode (206) in proximity to the intersection (107). As a consequence, ions in the saltwater are preferentially directed into the concentrated outlet channel (106), resulting in a brine (122) flowing through the concentrated outlet channel. Desalted water (124) flows into the dilute outlet channel (104).

Figure 3:
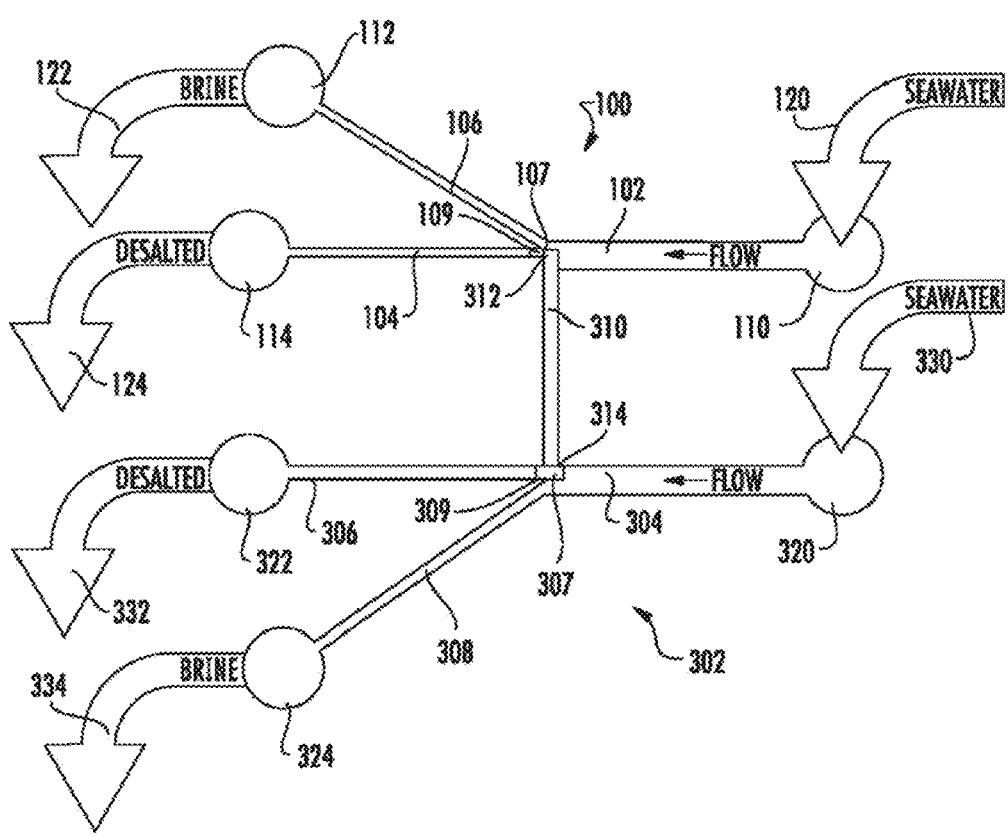
FIG. 3 is a schematic drawing illustrating a microfluidic device for the desalination of water. The device includes two desalination units electrochemically connected by a bipolar electrode.

In some embodiments, the auxiliary channel can comprise a desalination unit. In these embodiments, the microfluidic device can comprise two desalination units, which can be of identical or different structure. An example device comprising two desalination units is illustrated in FIG. 3. The device includes a first desalination unit (100) electrochemically connected to a second desalination unit (302) by a bipolar electrode (310). The first desalination unit (100) is fluidly isolated from the second desalination unit (302).

The first desalination unit (100) includes an inlet channel (102) fluidly connected to a dilute outlet channel (104) and a concentrated outlet channel (106). The dilute outlet channel (104) and the concentrated outlet channel (106) diverge from the inlet channel (102) at an intersection (107). The second desalination unit (302) includes an inlet channel (304) fluidly connected to a dilute outlet channel (306) and a concentrated outlet channel (308). The dilute outlet channel (306) and the concentrated outlet channel (308) diverge from the inlet channel (304) at an intersection (307).

A bipolar electrode (310) electrochemically connects the first desalination unit (100) and the second desalination unit (302). A first surface of the bipolar electrode (312) is in electrochemical contact with the first desalination unit (100), and is positioned in proximity to the intersection (107). The first surface of the bipolar electrode (312) is configured to form an ion depletion zone (109) downstream of the surface of the bipolar electrode during device operation, resulting in the formation of an electric field gradient in proximity to the intersection of the first desalination unit. A second surface of the bipolar electrode (314) is in electrochemical contact with the second desalination unit (302), and is positioned in proximity to the intersection of the second desalination unit (307). The second surface of the bipolar electrode (314) is configured to form an ion depletion zone (309) downstream of the surface of the bipolar electrode during device operation, resulting in the formation of an electric field gradient in proximity to the intersection of the second desalination unit. The example device further includes fluid reservoirs (110 and 320) fluidly connected to the upstream termini of the inlet channels of the first and second desalination units, fluid reservoirs (114 and 322) fluidly connected to the downstream termini of the dilute outlet channels of the first and second desalination units, and fluid reservoirs (112 and 324) fluidly connected to the downstream termini of the concentrated outlet channels of the first and second desalination units.

The second desalination unit (302), as well as all of the elements making up the second desalination unit (e.g., the inlet channel (304), the dilute outlet channel (306), and the concentrated outlet channel (308)) can have the same dimensions and relative configurations as those described above with respect to the first desalination unit. The first surface of the bipolar electrode (312) and the second surface of the bipolar electrode (314) can occupy the same positions within their respective desalination units, and have the same dimensions as the surface of electrode (108) described above with respect to the first desalination unit.

A power supply can be configured to apply a potential bias across the first desalination unit (100) and the second desalination unit (302). A flow of saltwater (120 and 330) can be initiated from the inlet channels of the first and second desalination units to the dilute outlet channels and the concentrated outlet channels of the first and second desalination units. Upon application of a potential bias, ion depletion zones (109 and 309) and subsequent electric field gradients are formed near the first surface of the bipolar electrode (312) in proximity to the intersection (107) of the first desalination unit, and near the second surface of the bipolar electrode (314) in proximity to the intersection (307) of the second desalination unit. As a consequence, ions in the saltwater are preferentially directed into the concentrated outlet channels of the first and second desalination units (106 and 308), resulting in a brine (122 and 334) flowing through the concentrated outlet channels of the first and second desalination units. Desalted water (124 and 332) flows into the dilute outlet channels (104 and 306) of the first and second desalination units.

The microfluidic devices described herein can further include one or more additional components (e.g., pressure gauges, valves, pressure inlets, pumps, fluid reservoirs, sensors, electrodes, power supplies, and combinations thereof) to facilitate device function. In some embodiments, the devices include a pump, valve, fluid reservoir, or combination thereof configured to regulate fluid flow into the inlet channel of the device.

The devices can include a salinometer configured to measure the salinity of fluid flowing through one or more of the microfluidic channels of the device. For example, in some cases, the devices can include a salinometer configured to measure the salinity of fluid flowing through the dilute outlet channel. The salinometer can measure the salinity of the fluid via any suitable means. For example, the salinometer can measure the fluid's electrical conductivity, specific gravity, index of refraction, or combinations thereof.

In certain embodiments, the devices include a salinometer configured to measure the salinity of fluid flowing through the dilute outlet channel, and a pump, valve, fluid reservoir, or combination thereof configured to regulate fluid flow into the inlet channel of the device. The devices can further include signal processing circuitry or a processor configured to operate the pump and/or valve connected to the inlet channel so as to adjust fluid flow into the inlet channel of the device in response to the salinity of fluid flowing through the dilute outlet channel.

Systems

A plurality of the microfluidic devices described herein can be combined to form a water purification system.

Water purification systems can comprise any number of the devices described herein. The number of devices incorporated within the water purification system can be selected in view of a number of factors, including the overall system design, the desired throughput of the system, salinity of the saltwater being treated using the system, and the desired degree of salinity reduction.

In some cases, the inlet channels of two or more of the devices in the system are fluidly connected to a common water inlet, so as to facilitate the flow of saltwater into the inlet channels of multiple devices in the system. Similarly, the dilute outlet channels of two or more of the devices in the system can be fluidly connected to a common water outlet, so as to facilitate the collection of desalted water from the dilute outlet channels of multiple devices in the system.

The system can comprise a plurality of the devices described herein arranged in parallel. Within the context of the systems described herein, two devices can be described as being arranged in parallel within a system when fluid flowing from either the dilute outlet channel or the concentrated outlet channel of the first device in the system does not subsequently flow into the inlet channel of the second device in the system.

Figure 4:
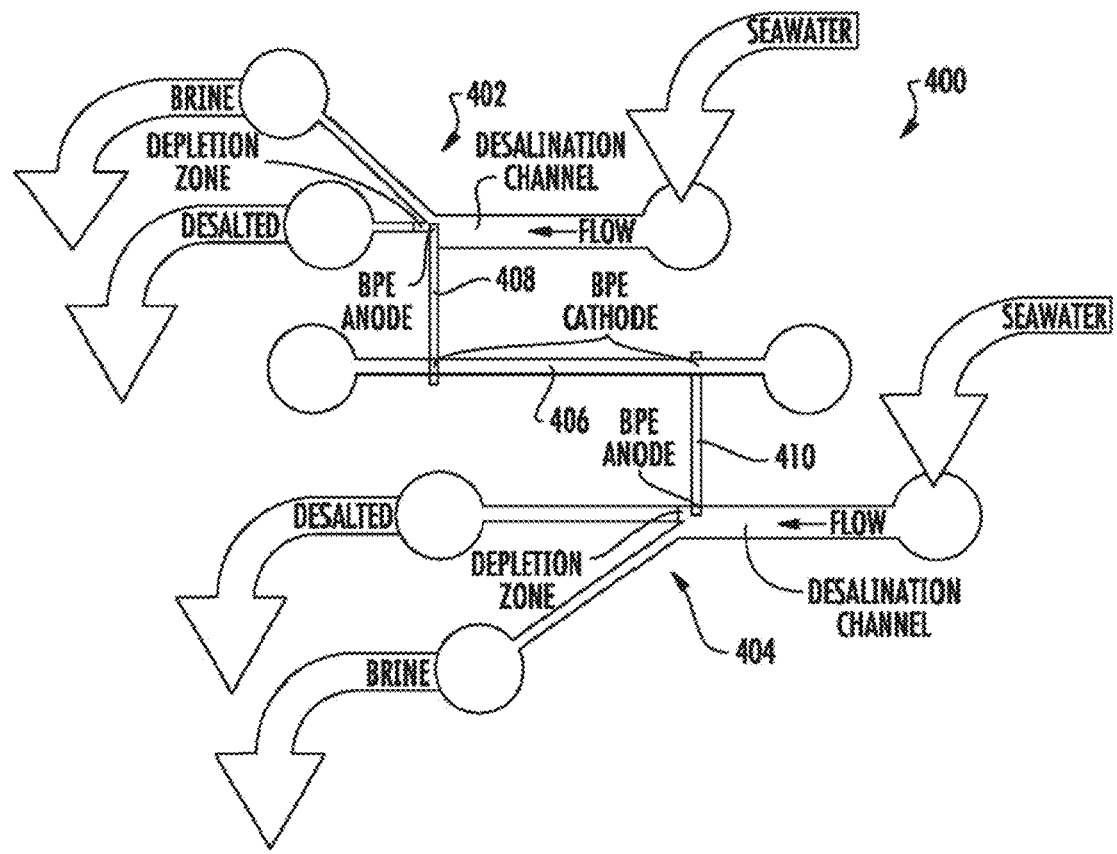
FIG. 4 is a schematic drawing of a water purification system for the desalination of water. The system includes multiple desalination units configured to operate in parallel.

By way of example, FIG. 4 is a schematic drawing of a water purification system (400) that includes a first desalination unit (402) and a second desalination unit (404) arranged in parallel. The example device further includes an auxiliary channel (406) which is fluidly isolated from both the first and second desalination unit. A first bipolar electrode (408) electrochemically connects the auxiliary channel (406) and the first desalination unit (402). A second bipolar electrode (410) electrochemically connects the auxiliary channel (406) and the second desalination unit (404). The example system can be operated by applying a potential bias between the auxiliary channel and the first and second desalination units.

Figure 5:
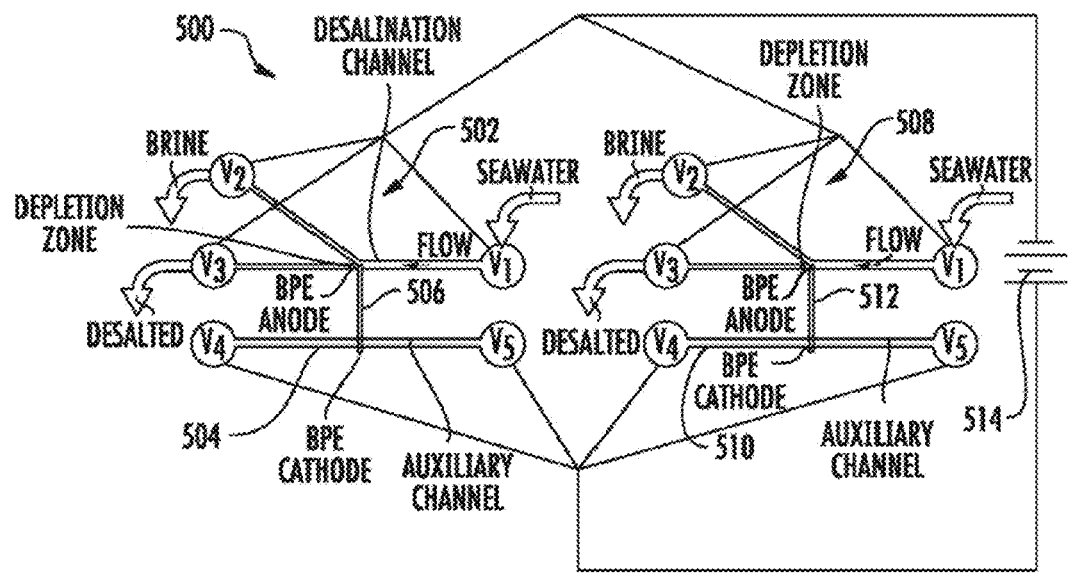
FIG. 5 is a schematic drawing of a water purification system for the desalination of water. The system includes multiple desalination units configured to operate in parallel.

FIG. 5 illustrates a second example water purification system (500) that includes two devices arranged in parallel. The system (500) comprises a first device which includes a first desalination unit (502) electrochemically connected to a first auxiliary channel (504) by a first bipolar electrode (506). The system (500) further comprises a second device which is arranged in parallel with respect to the first device, and which includes a second desalination unit (508) electrochemically connected to a second auxiliary channel (510)

by a second bipolar electrode (512). As illustrated in FIG. 5, a power supply can be configured to apply a potential bias across both the first auxiliary channel (504) and desalination unit (502) and the second auxiliary channel (510) and desalination unit (508).

The system can comprise a plurality of the devices described herein fluidly connected in series. Within the context of the systems described herein, two devices can be described as being fluidly connected in series within a system when fluid flowing from either the dilute outlet channel or the concentrated outlet channel of the first device in the system subsequently flows into the inlet channel of the second device in the system.

Figure 6:
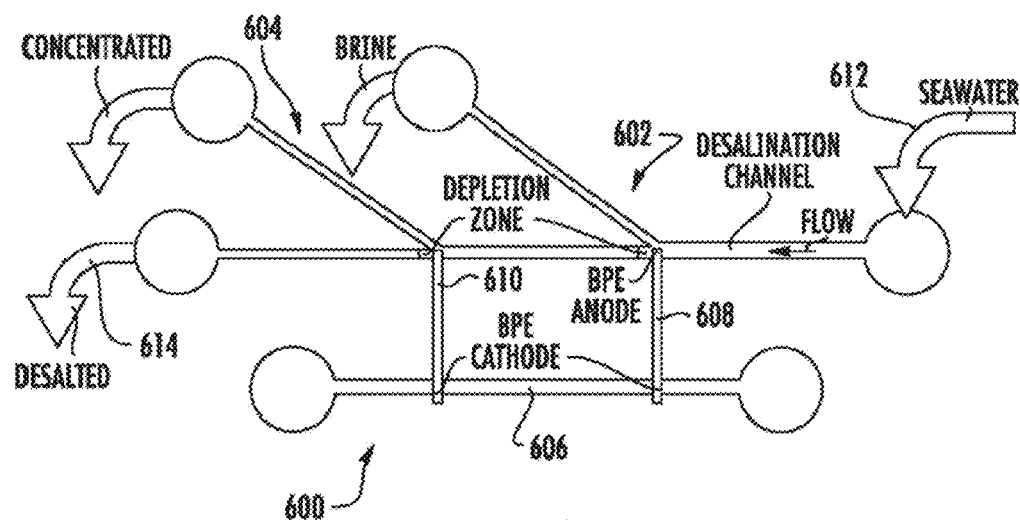
FIG. 6 is a schematic drawing of a water purification system for the desalination of water. The device includes multiple desalination units configured to operate in series.

By way of example, FIG. 6 is a schematic drawing of a water purification system (600) that includes two devices fluidly connected in series. The system (600) includes a first desalination unit (602) and a second desalination unit (604) fluidly connected in series, such that the dilute outlet channel of the first desalination unit is fluidly connected to the inlet channel of the second desalination unit. The example device further includes an auxiliary channel (606) which is fluidly isolated from both the first and second desalination unit. A first bipolar electrode (608) electrochemically connects the auxiliary channel (606) and the first desalination unit (602). A second bipolar electrode (610) electrochemically connects the auxiliary channel (606) and the second desalination unit (604). The example system can be operated by applying a potential bias between the auxiliary channel and the first and second desalination units.

If desired, the systems can contain a plurality of devices both arranged in parallel and fluidly connected in series. For example, the device can include a first pair devices fluidly connected in series which are arranged in parallel with a second pair of devices fluidly connected in series.

Methods of Making

The microfluidic devices and systems described herein can be fabricated from any substrate material which is non-conductive, and suitable for the flow of aqueous solutions through the microfluidic channels of the device or system. For example, the device or system can be fabricated, in whole or in part, from glass, silicon, or combinations thereof. The device or system can also be fabricated, in whole or in part, from a polymer and/or plastic, such as a polyester (e.g., polyethylene terephthalate; PET) polyurethane, polycarbonate, halogenated polymer (e.g., polyvinyl chloride and/or fluorinated polymer such as polytetrafluoroethylene (PTFE)), polyacrylate and/or poly methacrylate (e.g., polymethyl methacrylate; PMMA), silicone (e.g., polydimethylsiloxane; PDMS), a thermosetting resin (e.g., Bakelite), or a copolymer, blend, and/or combination thereof. The device or system can also be fabricated, in whole or in part, from a ceramic (e.g., silicon nitride, silicon carbide, titania, alumina, silica, etc.).

In certain embodiments, the device or system is fabricated, in whole or in part, from a photocurable epoxy. In certain embodiments, the device or system is fabricated, in whole or in part, from PDMS.

The microfluidic devices and systems described herein can be fabricated using a variety of microfabrication techniques known in the art. Suitable methods for the microfabrication of microfluidic devices include, for example, lithography, etching, embossing, roll-to-roll manufacturing, lamination, printing, and molding of polymeric substrates. The microfabrication process can involve one or more of the processes described below (or similar processes). Different portions of the device or system can be fabricated using different methods, and subsequently assembled or bonded together to form the final microfluidic device or system. Suitable fabrication methods can be selected in view of a number of factors, including the nature of the substrate(s) used to form the device or system, performance requirements, and the dimensions of the microfluidic features making up the device or system.

Lithography involves use of light or other form of energy such as electron beam to selectively alter a substrate material. Typically, a polymeric material or precursor (e.g., photoresist, a light-resistant material) is coated on a substrate and is selectively exposed to light or other form of energy. Depending on the photoresist, exposed regions of the photoresist either remain or are dissolved in subsequent processing steps known generally as "developing." This process results in a pattern of the photoresist on the substrate. In some embodiments, the photoresist is used as a master in a molding process. In some embodiments, a polymeric precursor is poured on the substrate with photoresist, polymerized (i.e., cured) and peeled off. The resulting polymer is bonded or glued to another flat substrate after drilling holes for inlets and outlets.

In some embodiments, the photoresist is used as a mask for an etching process. For example, after patterning photoresist on a silicon substrate, channels can be etched into the substrate using a deep reactive ion etch (DRIE) process or other chemical etching process known in the art (e.g., plasma etch, KOH etch, HF etch, etc.). The photoresist can then be removed, and the substrate can be bonded to another substrate using one of any bonding procedures known in the art (e.g., anodic bonding, adhesive bonding, direct bonding, eutectic bonding, etc.). Multiple lithographic and etching steps and machining steps such as drilling can be included. Carbon electrodes may be fabricated in place by means of photoresist pyrolysis.

In some embodiments, a polymeric substrate, such as PMMA, can be heated and pressed against a master mold for an embossing process. The master mold can be formed by a variety of processes, including lithography and machining. The polymeric substrate can then be bonded with another substrate to form a microfluidic device or system. Machining processes can be included if necessary.

Devices and systems can also be fabricated using an injection molding process. In an injection molding process, a molten polymer or metal or alloy is injected into a suitable mold and allowed to cool and solidify. The mold typically consists of two parts that allow the molded component to be removed. Parts thus manufactured can be bonded to result in the device or system.

In some embodiments, sacrificial etch can be used to form the device or system. Lithographic techniques can be used to pattern a material on a substrate. This material can then be covered by another material of different chemical nature. This material can undergo lithography and etch processes, or another suitable machining process. The substrate can then be exposed to a chemical agent that selectively removes the first material. In this way, channels can be formed in the second material, leaving voids where the first material was present before the etch process.

In some embodiments, microchannels can be directly machined into a substrate by laser machining or CNC machining. If desired, several layers can be machined, and subsequently bonded together to obtain the final device or system.

Electrodes as well as other electrical device components can be fabricated within the devices and systems by patterning suitable conductive materials on and/or within substrate materials using a number of suitable methods known in the art.

In one or more embodiments, the conductive material includes one or more metals. Non-limiting examples of suitable metals include Sn, Zn, Au, Ag, Ni, Pt, Pd, Al, In, Cu, or a combination thereof. Other suitable conductive materials include metal oxides and conductive non-metals (e.g., carbon derivatives such as graphite). Conductive materials can be deposited using a vacuum deposition process (e.g., cathodic arc deposition, electron beam physical vapor deposition, evaporative deposition, pulsed laser deposition, or sputter deposition). Conductive material can also be provided in the form of a conductive ink which can be screen printed, ink-jet printed, or otherwise deposited onto the surface of the substrate material to form an electrical device component. Conductive inks are typically formed by blending resins or adhesives with one or more powdered conductive materials such as Sn, Zn, Au, Ag, Ni, Pt, Pd, Al, In, Cu, graphite powder, carbon black, or other conductive metals or metal alloys. Examples include carbon-based inks, silver inks, and aluminum inks.

When forming an electrical device component, such as an electrode, in the devices or systems described herein, one or more conductive materials will preferably be deposited or applied as a thin film. In certain embodiments, the conductive layers are thin metallic or carbon films which are about 50 microns in thickness or less (e.g., about 40 microns in thickness or less, about 30 microns in thickness or less, about 25 microns in thickness or less, about 20 microns in thickness or less, about 15 microns in thickness or less, about 10 microns in thickness or less, about 5 microns in thickness or less, about 1 micron in thickness or less, about 900 nm in thickness or less, about 800 nm in thickness or less, about 750 nm in thickness or less, about 700 nm in thickness or less, about 600 nm in thickness or less, about 500 nm in thickness or less, about 400 nm in thickness or less, about 300 nm in thickness or less, or about 250 nm in thickness or less).

Methods of Using

The microfluidic devices and systems described herein can be used to decrease the salinity of water. The salinity of water can be decreased by flowing saltwater through the desalination unit of a device or system described herein, and performing a faradaic reaction at the electrode positioned in proximity to the intersection of the desalination unit. The faradaic reaction generates an electric field gradient that directs ions in the saltwater away from the dilute outlet channel of the desalination unit, and towards the concentrated outlet channel of the desalination unit. As a result, the salinity of water which flows into the dilute outlet channel is lower than the salinity of the saltwater flowing into the inlet channel.

In some embodiments, methods of decreasing the salinity of water include providing a flow of saltwater through the inlet channel of a device described herein or the water inlet of a system described herein, applying a potential bias to generate an electric field gradient that influences the flow of ions in the saltwater through the desalination unit of the device or the desalination units of the system, and collecting water from the dilute outlet channel of the device or the water outlet of the system. In these methods, the water collected from the dilute outlet channel of the device or the water outlet of the system can have a lower electrical conductivity than the saltwater flowed through the inlet channel of the device or the water inlet of the system.

In some embodiments, the potential bias applied to generate an electric field gradient is greater than about 1 volt (e.g., greater than about 2 volts, greater than about 2.5 volts, greater than about 3 volts, greater than about 4 volts, greater than about 5 volts, greater than about 6 volts, greater than about 7 volts, greater than about 8 volts, or greater than about 9 volts). In some embodiments, the potential bias applied to generate an electric field gradient is less than about 10 volts (e.g., less than about 9 volts, less than about 9 volts, less than about 8 volts, less than about 7 volts, less than about 6 volts, less than about 5 volts, less than about 4 volts, less than about 3 volts, less than about 2.5 volts, or less than about 2 volts).

The potential bias applied to generate an electric field gradient can range from any of the minimum voltages to any of the maximum voltages described above. In some embodiments, the potential bias applied to generate an electric field gradient ranges from about 1 volt to about 10 volts (e.g., from about 1 volt to about 7 volts, from about 2 volts to about 7 volts, or from about 2.5 to about 5 volts).

In some embodiments, the flow rate of the saltwater through the desalination unit of the device or the flow rate of the saltwater through each desalination unit of the system ranges from about 0.01 to about 1 microliter per minute (e.g., from about 0.05 to about 0.5 microliters per minute, or from about 0.1 to about 0.5 microliters per minute). Suitable flow rates can be selected in view of a variety of factors including the architecture of the device or system, the salinity of the saltwater being treated using the device or system, and the desired degree of salinity reduction.

The devices, systems, and methods described herein can be used to decrease the salinity of saltwater having any measurable concentration of dissolved sodium chloride. The saltwater can be seawater (e.g., saltwater having a conductivity of between about 4 S/m and about 6 S/m). The saltwater can be brackish water (e.g., saltwater having a conductivity of between about 0.05 S/m and about 4 S/m). In certain embodiments, the saltwater has a conductivity of greater than about 0.05 S/m (e.g., greater than about 0.1 S/m, greater than about 0.5 S/m, greater than about 1.0 S/m, greater than about 2.0 S/m, greater than about 2.5 S/m, greater than about 3.0 S/m, greater than about 3.5 S/m, greater than about 4.0 S/m, greater than about 4.5 S/m, greater than about 5.0 S/m, or greater than about 5.5 S/m).

The devices, systems, and methods described herein can be used to decrease the salinity of saltwater by varying degrees. The degree of salinity reduction can depend on a number of factors, including the architecture of the device or system, and the salinity of the saltwater being treated using the device or system.

In some embodiments, the conductivity of the water desalinated using the devices, systems, and methods described herein (e.g., the water collected from the dilute outlet channel of the device or the water outlet of the system) does not exceed about 90% of the conductivity of the saltwater flowed into the device or system (e.g., it does not exceed about 80% of the conductivity of the saltwater flowed into the device or system, it does not exceed about 75% of the conductivity of the saltwater flowed into the device or system, it does not exceed about 70% of the conductivity of the saltwater flowed into the device or system, it does not exceed about 60% of the conductivity of the saltwater flowed into the device or system, it does not exceed about 50% of the conductivity of the saltwater flowed into the device or system, it does not exceed about 40% of the conductivity of the saltwater flowed into the device or system, it does not exceed about 30% of the conductivity of the saltwater flowed into the device or system, it does not exceed about 25% of the conductivity of the saltwater flowed into the device or system, it does not exceed about 20% of the conductivity of the saltwater flowed into the device or system, it does not exceed about 10% of the conductivity of the saltwater flowed into the device or system, it does not exceed about 5% of the conductivity of the saltwater flowed into the device or system, it does not exceed about 1% of the conductivity of the saltwater flowed into the device or system, it does not exceed about 0.5% of the conductivity of the saltwater flowed into the device or system, it does not exceed about 0.1% of the conductivity of the saltwater flowed into the device or system, it does not exceed about 0.05% of the conductivity of the saltwater flowed into the device or system, it does not exceed about 0.01% of the conductivity of the saltwater flowed into the device or system, or less).

In some cases, water desalinated using the devices, systems, and methods described herein (e.g., water collected from the dilute outlet channel of the device or the water outlet of the system) has a conductivity of less than about 2.0 S/m (e.g., less than about 1.75 S/m, less than about 1.5 S/m, less than about 1.25 S/m, less than about 1.0 S/m, less than about 0.75 S/m, less than about 0.5 S/m, less than about 0.25 S/m, less than about 0.1 S/m, less than about 0.05 S/m, less than about 0.01 S/m, less than about 0.005 S/m, less than about 0.001 S/m, less than about $5.0 \times 10^{-4}$ S/m, less than about $1.0 \times 10^{-4}$ S/m, less than about $5.0 \times 10^{-5}$ S/m, less than about $1.0 \times 10^{-5}$ S/m, or less).

In some embodiments, the water desalinated using the devices, systems, and methods described herein (e.g., water collected from the dilute outlet channel of the device or the water outlet of the system) is drinking water (e.g., the water has a conductivity of from about 0.05 S/m to about 0.005 S/m). In some embodiments, the water desalinated using the devices, systems, and methods described herein (e.g., water collected from the dilute outlet channel of the device or the water outlet of the system) is ultrapure water (e.g., the water has a conductivity of from about 0.005 S/m to about $5.5 \times 10^{-6}$ S/m).

If desired, water can be treated multiple times using the devices, systems, and methods described herein to achieve a desired decrease in the salinity of the saltwater.

The devices and systems described herein can be used to desalinate water with greater energy efficiency than conventional desalination methods. In some cases, the devices and systems described herein can be used to desalinate water with at an energy efficiency of less than about 1000 mWh/L (e.g., at least about 900 mWh/L, at least about 800 mWh/L, at least about 750 mWh/L, at least about 700 mWh/L, at least about 600 mWh/L, at least about 500 mWh/L, at least about 400 mWh/L, at least about 300 mWh/L, at least about 250 mWh/L, at least about 200 mWh/L, at least about 100 mWh/L, at least about 90 mWh/L, at least about 80 mWh/L, at least about 75 mWh/L, at least about 70 mWh/L, at least about 60 mWh/L, at least about 50 mWh/L, at least about 40 mWh/L, at least about 30 mWh/L, at least about 25 mWh/L, at least about 20 mWh/L, at least about 15 mWh/L, or at least about 10 mWh/L, or at least about 5 mWh/L). In some embodiments, the devices and systems described herein can be used to desalinate water with at an energy efficiency ranging from any of the minimum values above to about 1 mWh/L (e.g., from at least about 1000 mWh/L to about 1 mWh/L, from at least about 500 mWh/L to about 1 mWh/L, from at least about 100 mWh/L to about 1 mWh/L, from at least about 75 mWh/L to about 1 mWh/L, or from at least about 50 mWh/L to about 1 mWh/L).

In some cases, the saltwater is not pre-treated prior to desalination with the devices and systems described herein. In other embodiments, the saltwater can be treated prior to desalination. For example, the removal of multivalent cations (e.g., $Ca^{2+}$, $Mg^{2+}$, or combinations thereof) from saltwater prior to desalination could reduce precipitate formation within the device or system over long operation times. Accordingly, in some embodiments, the saltwater can be pre-treated to reduce the level of dissolved multivalent cations in solution, for example, by contacting the saltwater with a suitable ion exchange resin. If necessary, saltwater can also be pre-treated to remove debris, for example, by sedimentation and/or filtration. If desired, saltwater can also be disinfected prior to desalination.

If desired for a particular end use, water can be further treated following desalination with the devices and systems described herein. For example, water can be fluoridated by addition of a suitable fluoride salt, such as sodium fluoride, fluorosilicic acid, or sodium fluorosilicate. Water can also be passed through an ion exchange resin and/or treated to adjust pH following desalination with the devices and systems described herein.

EXAMPLES

Example 1

Desalination Using a Microfluidic Device

A microelectrochemical cell comprising a desalination unit and an auxiliary channel spanned by a single bipolar electrode (BPE) was used to desalinate seawater along a locally generated electric field gradient in the presence of pressure driven flow (PDF). Seawater desalination was achieved by applying a potential bias between a parallel desalination unit and auxiliary channel to drive the oxidation of chloride at the anodic pole of the bipolar electrode. At the cathodic pole, water reduction occurs to support current flow.

The oxidation of chloride at the anodic pole of the BPE results in an ion depletion zone and subsequent electric field gradient. The electric field gradient directed ions flowing through the desalination unit into a branching microchannel, creating a brine stream, while desalted water continued to flow forward when the rate of pressure driven flow was controlled. Seawater desalination could thus be achieved by controlling the rate of pressure driven flow to create both a salted and desalted stream.

Materials and Methods

Fabrication of Microfluidic Device

A PDMS/quartz hybrid microfluidic device was prepared using microfabrication methods known in the art. The structure of the microfluidic device is schematically illustrated in FIG. 2. The device comprises a desalination unit and an auxiliary channel spanned by a single bipolar electrode.

A pyrolyzed photoresist carbon electrode was fabricated on a quartz slide (1 in×1 in). Photoresist was spin coated onto the slide at 3500 rpm for 45 seconds, and then soft baked on a hot plate at 100° C. for 1 minute to remove excess solvent. The device was then exposed to a UV lamp with patterned mask above to reveal the electrode (100 μm wide by 6.3 mm long) design. The excess photoresist was then removed by development. The devices were then placed in a quartz tube furnace with a forming gas of 5% $H_2$ and 95% $N_2$ continuously flowing at 100 standard cubic centimeters per minute to allow the photoresist to pyrolyze. After pyrolysis, the device was cooled to room temperate.

A PDMS desalination unit (5.0 mm long and 22 µm tall) with a 100 µm wide inlet channel and 50 µm wide dilute outlet channel and concentrated outlet channel was fabricated parallel to an auxiliary channel (5.0 mm long, 22 µm tall, 100 µm wide) using a SU-8 photoresist mold patterned on a silicon wafer. The separation between the desalination unit and the auxiliary channel was 6.0 mm (center-to-center). The PDMS channels were rinsed with ethanol and dried under $N_2$, then the PDMS and quartz/electrode surfaces were exposed to an air plasma for 15 seconds, and finally the two parts were bound together with the BPE aligned at the intersection where the dilute outlet channel and concentrated outlet channel diverge from the inlet channel. The PDMS/quartz microfluidic device was then placed in an oven at 65° C. for 5 min to promote irreversible bonding.

Evaluation of Desalination

Seawater collected from Port Aransas, Tex. was used to evaluate desalination. To prevent obstruction of the microfluidic channel, the seawater samples were allowed to undergo a simple sedimentation process before sample collection. The seawater was spiked with a cationic (20 µM Ru(bpy)$^{2+}$) tracer to fluorescently monitor the movement of ions through the desalination unit during desalination.

A solution height differential was created between the fluid reservoir fluidly connected to the inlet channel (110; $V_1$) and the fluid reservoirs fluidly connected to the concentrated outlet channel (112; $V_2$) and fluidly connected to the dilute outlet channel (114, $V_3$). In this way, a pressure driven flow (PDF) from right to left was initiated.

Results

Using Au driving electrodes, $E_{tot}$=2.5 V was applied to reservoirs 212 and 210 while fluid reservoirs 110, 112, and 114 were grounded. The potential bias created a sufficiently large potential difference between the poles of the BPE (204) to drive water oxidation and reduction at the BPE anode (206) and cathode (208). See Eqn. 1 and 2, respectively. Moreover, chloride oxidation occurred at the BPE anode (206; Eqn. 3) directly resulting in an ion depletion zone near the BPE as chlorine was generated.

$$2H_2O - 4e^- \leftrightarrow O_2 + 4H^+ \quad \text{(Eqn. 1)}$$

$$2H_2O + 2e^- \leftrightarrow H_2 + 2OH^- \quad \text{(Eqn. 2)}$$

$$2Cl^- - 2e^- \leftrightarrow Cl_2(2) \quad \text{(Eqn. 3)}$$

In addition, $H^+$ electrogenerated by water oxidation (Eqn. 1) can neutralize bicarbonate and borate that can be present in seawater, further contributing to the strength of the ion depletion zone (109) and subsequently formed electric field gradient. With PDF from right to left, seawater, and thus the ions present is seawater, were transported toward the electric field gradient formed at intersection where the dilute outlet channel (104) and concentrated outlet channel (106) diverge from the inlet channel (102).

The electrophoretic velocity ($\mu_{ep}$) of a charged analyte is governed by Eqn. 4, where $\mu_{ep}$ is the analyte's electrophoretic mobility and $V_1$ is the local electric field strength.

$$u_{ep} = \mu_{ep} V_1 \quad \text{(Eqn. 4)}$$

In all regions of the device depicted in FIG. 2, except near the ion depletion zone formed by the anode of the bipolar electrode in proximity to the intersection where dilute outlet channel and concentrated outlet channel diverge from the inlet channel, the transport of water and all dissolved species is controlled by PDF. As a consequence, all neutrals and ions to move generally in the direction of fluid flow (i.e., from right to left) throughout the device. However, as ions approach the local electric field gradient formed by the electrode in proximity to the intersection, they experience an increasing $\mu_{ep}$ as the electric field strength increases. In the case of cations, this gradient causes them to redirect toward the grounded reservoir in the brine stream as a result of the local electrophoretic velocity of the ions ($\mu_{ep}$) exceeding the mean convective velocity of the fluid (PDF). To maintain electroneutrality with the microchannel, anions are also redirected into the brine stream.

Figure 7A:
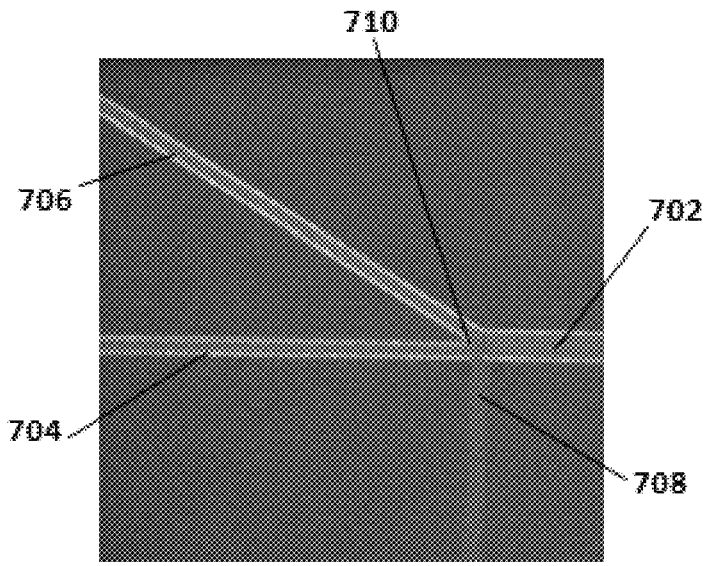
FIGS. 7A-7B are fluorescence micrographs illustrating the flow of a solution of Ru(bpy)$^{2+}$ (a fluorescent cationic tracer) in saltwater through the device illustrated in FIG. 2.
Figure 7B:
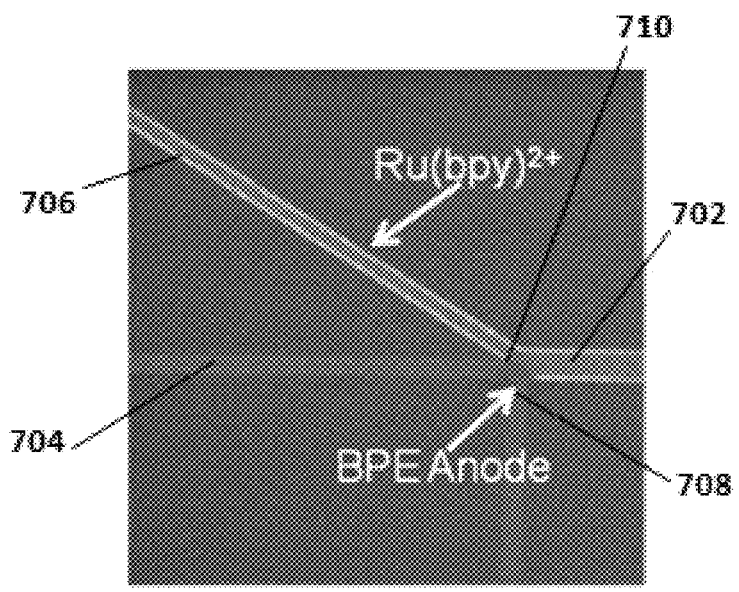

The flow of ionic species through the microchannels of the device was monitored by observing the flow of Ru(bpy)$^{2+}$ (a fluorescent cationic tracer) through the device. FIGS. 7A and 7B are fluorescence micrographs of the device taken before (FIG. 7A) and after (FIG. 7B) application of a potential bias. As shown in FIG. 7A, when no potential bias was applied, ions flowed through the inlet channel (702), and into both the dilute outlet channel (704) and the concentrated outlet channel (706). Upon application of a potential bias, an ion depletion zone and subsequent electric field gradient are formed near the BPE anode (708) in proximity to the intersection (710) of the dilute outlet channel (704) and the concentrated outlet channel (706; FIG. 7B). As a consequence, ions, including the fluorescent cationic tracer Ru(bpy)$^{2+}$, are directed into the concentrated outlet channel (706). Desalted water (which is non-fluorescent in the micrograph due to the absence of fluorescent cationic tracer Ru(bpy)$^{2+}$) flows into the dilute outlet channel (704). These results demonstrate that both cations and anions flow into the concentrated outlet channel (706). The initial application of 2.5 V creates an oxidizing environment near the BPE anode which causes partial dissolution of the Au anode.

Figure 8:
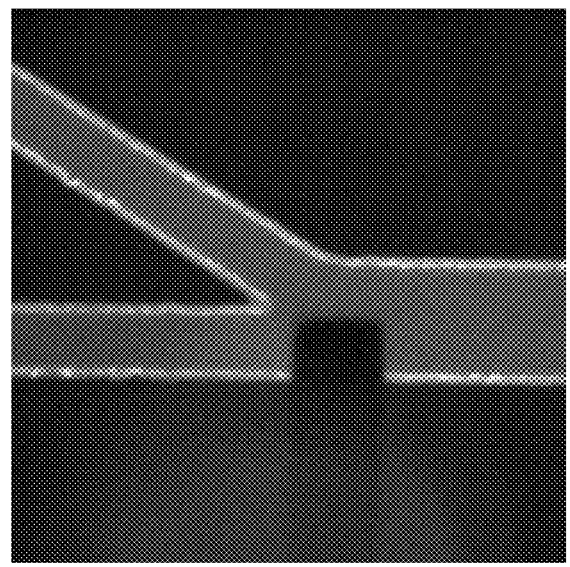
FIG. 8 is a fluorescence micrograph illustrating the flow of a solution of Ru(bpy)$^{2+}$ (a fluorescent cationic tracer) in Na$_2$SO$_4$ through the device illustrated in FIG. 2 upon application of a potential bias.

To confirm that the formation of an ion depletion zone resulted in the deionization of the fluid flowing into the device, a similar experiment was conducted using a solution lacking chloride ions. If all chloride ions are eliminated from solution, one would not expect the BPE anode to induce formation of an ion depletion zone and local electric field gradient (as in the case of saltwater containing chloride ions). In the control experiment, a solution of $Na_2SO_4$ was flowed through the device. As shown in FIG. 8, upon application of 2.5 V, no decrease in fluorescence intensity near the BPE anode was observed. This finding was consistent with the seawater desalination being the result of an ion depletion zone formed near the BPE anode.

Figure 9:
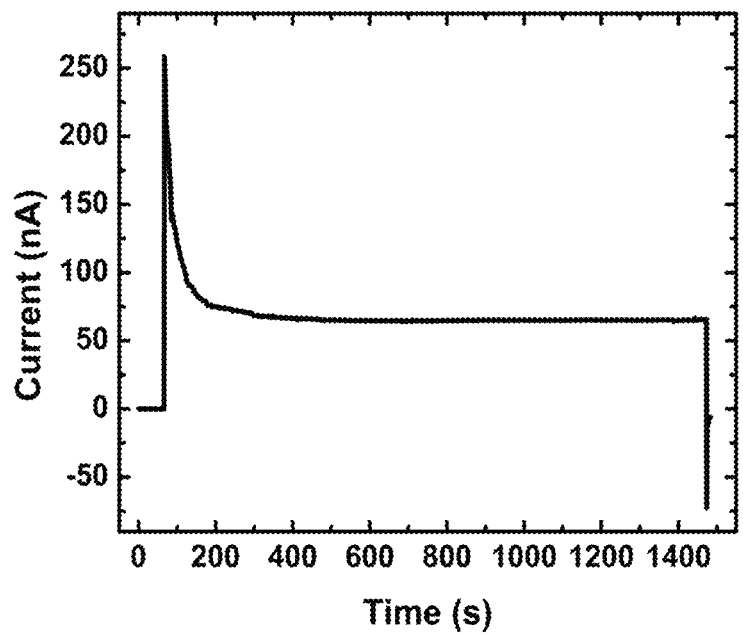
FIG. 9 is a graph of total current flowing through the device illustrated in FIG. 2 ($i_{tot}$, plotted in nanoamperes) as a function of time (in seconds) during operation.

FIG. 9 shows a representative plot of total current flowing through the device ($i_{tot}$) vs. time. The steady-state operating current of the device was 65 nA. With a 2.5 V potential bias driving the desalination process, the device operated at a power consumption of only 162.5 nW.

Fluid flow rates through the dilute outlet channel could be measured using non-charged beads. Fluid flow rates through the dilute outlet channel could also be measured by tracking the movement of fluorescent tracer after the 2.5 V driving potential was turned off, in which case all mass transport was due to PDF.

The average operating fluid flow rate of the devices was ~400 µm/s. At higher fluid flow rates, the ion depletion zone does not extend as far into the dilute outlet channel. Consequently, the desalination process becomes less efficient, and ions begin to flow into the dilute outlet channel during device operation.

Using the device operating at 162.5 nW, 34 mWh/L energy efficiencies were achieved. This energy efficiency is orders of magnitude higher than the current state-of-the-art seawater desalination technologies. For example, reverse osmosis is typically performed at energy efficiencies of approximately 5 Wh/L, and has only achieved maximum energy efficiencies of approximately 1.8 Wh/L. This superior efficiency of the microfluidic device relative to reverse osmosis is particularly notable when considering that these reverse osmosis energy efficiencies correspond to the efficiencies of industrial desalination facilities (which are often higher than efficiencies observed for the same process conducted on a smaller scale).

A reduction in device scale typically results in a decrease in energy efficiency. As a consequence, these devices appear to be extremely competitive for small-scale desalination use. Moreover, because little equipment is required, and device operation only requires a 2.5 V power supply, these devices can be used in water stresses regions. In addition, because BPEs do not require a direct electrical connection, it is possible to simultaneously operate numerous devices in parallel using a simple power supply.

The devices, systems, and methods of the appended claims are not limited in scope by the specific devices, systems, and methods described herein, which are intended as illustrations of a few aspects of the claims. Any devices, systems, and methods that are functionally equivalent are intended to fall within the scope of the claims. Various modifications of the devices, systems, and methods in addition to those shown and described herein are intended to fall within the scope of the appended claims. Further, while only certain representative devices, systems, and method steps disclosed herein are specifically described, other combinations of the devices, systems, and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A microfluidic device comprising
   (a) a desalination unit comprising an inlet channel fluidly connected to a dilute outlet channel and a concentrated outlet channel, wherein the dilute outlet channel and the concentrated outlet channel diverge from the inlet channel at an intersection; and
   (b) an electrode in electrochemical contact with the desalination unit in proximity to the intersection;
   wherein the electrode is configured to generate an electric field gradient in proximity to the intersection.

2. The device of claim 1, wherein the electrode comprises an anode.

3. The device of claim 1, wherein the inlet channel has a width of from about 150 microns to about 25 microns.

4. The device of claim 1, wherein the dilute outlet channel, the concentrated outlet channel, or both the dilute outlet channel and the concentrated outlet channel have a width of from about 80 microns to about 10 microns.

5. The device of claim 1, wherein the sum of the area of a cross-section of dilute outlet channel and the area of a cross-section of the concentrated outlet channel is substantially equal to the area of a cross-section of the inlet channel.

6. The device of claim 1, wherein the angle formed between the dilute outlet channel and the concentrated outlet channel at the intersection is 60 degrees or less.

7. The device of claim 1, further comprising an auxiliary channel fluidly isolated from the desalination unit.

8. The device of claim 7, wherein the electrode comprises a bipolar electrode electrochemically connecting the desalination unit and the auxiliary channel.

9. The device of claim 8, wherein the bipolar electrode comprises an anode in electrochemical contact with the desalination unit and a cathode in electrochemical contact with the auxiliary channel.

10. The device of claim 7, wherein the auxiliary channel comprises
    a second desalination unit comprising an inlet channel fluidly connected to a dilute outlet channel and a concentrated outlet channel, wherein the dilute outlet channel and the concentrated outlet channel diverge from the inlet channel at an intersection; and an electrode in electrochemical contact with the second desalination unit;
    wherein the electrode is configured to generate an electric field gradient in proximity to the intersection where the dilute outlet channel and the concentrated outlet channel diverge from the inlet channel.

11. A water purification system comprising a plurality of devices defined by claim 1, wherein the inlet channels of the plurality of devices are fluidly connected to a water inlet, and the dilute outlet channels of the plurality of devices are fluidly connected to a water outlet.

12. The device of claim 1, wherein the electrode is formed from a conductive material selected from the group consisting of a metal, a metal alloy, a metal oxide, a conductive carbon material, or a combination thereof.

13. The device of claim 1, wherein the electrode is positioned at a location relative to the intersection such that the electric field gradient generated in proximity to the intersection can preferentially direct ions flowing through the inlet channel into the concentrated outlet channel.

14. The device of claim 1, wherein the electrode is positioned on or within the floor of the inlet channel.

15. The device of claim 1, wherein the electrode is positioned upstream of the intersection, and within about 500 microns of the intersection.

16. The device of claim 1, wherein the electrode is positioned downstream of the intersection, and within about 100 microns of the intersection.

17. The device of claim 1, wherein the electrode is positioned within about 50 microns of the intersection.

18. The device of claim 1, wherein the dilute outlet channel has a width, and wherein a surface of the electrode in electrochemical contact with the desalination unit has a width of at least 50% of the width of the dilute outlet channel.

19. A method of decreasing the salinity of water comprising
(a) providing a flow of saltwater through the inlet channel of the device defined by claim 1;
(b) applying a potential bias to generate an electric field gradient that influences the flow of ions through the desalination unit of the device defined by claim 1; and
(c) collecting water from the dilute outlet channel of the device defined by claim 1;
wherein the water collected from the dilute outlet channel of the device defined by claim 1 has a lower electrical conductivity than the saltwater.

20. The method of claim 19, wherein the saltwater comprises seawater.

21. The method of claim 19, wherein the saltwater comprises brackish water.

22. The method of claim 19, wherein the conductivity of the water collected does not exceed about 80% of the conductivity of the saltwater.

23. The method of claim 19, wherein the water collected has a conductivity of less than about 0.1 S/m.

24. The method of claim 19, wherein the water collected has a conductivity of from about 0.05 S/m to about 0.005 S/m.

25. The method of claim 19, wherein the water collected has a conductivity of from about 0.005 S/m to about $5.5 \times 10^{-6}$ S/m.

26. The method of claim 19, wherein potential bias applied ranges from about 1 volt to about 10 volts.

27. The method of claim 19, wherein the rate of flow of the saltwater through the desalination unit of the device defined by claim 1 ranges from about 0.01 to about 1 microliter per minute.

28. A method of decreasing the salinity of water comprising
(a) flowing saltwater through a desalination unit comprising an inlet channel fluidly connected to a dilute outlet channel and a concentrated outlet channel, wherein the dilute outlet channel and concentrated outlet channel diverge from the inlet channel at an intersection; and
(b) performing a faradaic reaction at an electrode positioned in proximity to the intersection to generate an electric field gradient;
wherein the electric field gradient directs ions in the saltwater away from the dilute outlet channel.

* * * * *